US008225903B2

(12) United States Patent
Dunn

(10) Patent No.: US 8,225,903 B2
(45) Date of Patent: Jul. 24, 2012

(54) CAB SUSPENSION

(75) Inventor: James Thomas Dunn, Winnipeg (CA)

(73) Assignee: MacDon Industries Ltd., Winnipeg, MB (CA)

(*) Notice: Subject to any disclaimer, the term of this patent is extended or adjusted under 35 U.S.C. 154(b) by 105 days.

(21) Appl. No.: 12/945,325

(22) Filed: Nov. 12, 2010

(65) Prior Publication Data
US 2011/0108333 A1 May 12, 2011

(51) Int. Cl.
*B62D 33/08* (2006.01)
(52) U.S. Cl. .......... 180/327; 180/89.12; 180/89.13; 296/190.04
(58) Field of Classification Search .......... 180/327, 180/89.12, 89.13; 297/190.04
See application file for complete search history.

(56) References Cited

U.S. PATENT DOCUMENTS

| | | | | |
|---|---|---|---|---|
| 3,347,558 A * | 10/1967 | Grimes et al. | | 280/775 |
| 3,737,003 A * | 6/1973 | Beals et al. | | 180/78 |
| 4,134,617 A * | 1/1979 | Matsubara | | 297/344.15 |
| 4,278,144 A * | 7/1981 | Perin | | 180/329 |
| 5,368,118 A * | 11/1994 | Hoefle | | 180/89.12 |
| 6,109,381 A * | 8/2000 | Stuyvenberg et al. | | 180/89.12 |
| 6,206,121 B1 * | 3/2001 | Michel | | 180/89.13 |
| 6,769,836 B2 * | 8/2004 | Lloyd | | 404/75 |
| 7,032,703 B2 * | 4/2006 | Wulfert et al. | | 180/329 |
| 7,159,687 B2 * | 1/2007 | Dunn et al. | | 180/329 |
| 7,306,062 B2 * | 12/2007 | Dunn | | 180/6.48 |
| 7,721,830 B2 * | 5/2010 | Dunn et al. | | 180/6.48 |
| 8,117,812 B2 * | 2/2012 | Patterson | | 56/228 |
| 8,157,042 B2 * | 4/2012 | Fujiki | | 180/89.12 |
| 2005/0051373 A1 * | 3/2005 | Bernhardt et al. | | 180/89.12 |

* cited by examiner

*Primary Examiner* — Joseph Rocca
*Assistant Examiner* — Nicole Verley
(74) *Attorney, Agent, or Firm* — Adrian D. Battison; Ade & Company Inc.

(57) ABSTRACT

A suspension for a cab base on the frame of a swather tractor includes four dampened springs at the four corners with three links each pivoted on one end of the frame and the other end on the base. The links include two parallel links in the fore and aft direction parallel to the mechanical speed control link arm and one side to side link which constrain movement of the base against fore and aft movement and side to side movement parallel to the mechanical steering control link arm. This arrangement restricts movement of the base while allowing roll and pitch movements of the cab structure with the links arranged such that steering and ground speed are substantially unaffected when the cab moves on the suspension.

12 Claims, 13 Drawing Sheets

CAB SUSPENSION

This application claims priority under 35 USC 119 of Provisional application Ser. No. 12/616,989 filed Nov. 12, 2009.

This invention relates to a cab suspension system for a hydraulically driven and steered swather tractor.

BACKGROUND OF THE INVENTION

Hydrostatically steered tractors have been available for many years and their application to windrowers has been significant. There has been a limit to the transport speed of these windrowers due to instability at high speed with the drive wheels ahead of the castor wheels (cab forward). Higher speeds on the road allow the user to cover large distances without the use of trailers and tow vehicles.

In U.S. Pat. No. 7,306,062 issued Dec. 11, 2007 by inventor Dunn and assigned to the present assignee is shown a tractor of this type in which the machine travels in transport mode with the castor wheels leading the drive wheels (engine forward), and in this position the machine is much more stable and higher speeds are possible.

While in a turn with a self-propelled machine that has the steered wheels leading, the centrifugal force at the center of gravity is such that it tends to assist the rear driving wheels in straightening out the machine. On the other hand when in a turn with a self-propelled machine that has the driving wheels leading, the centrifugal force at the center of gravity is such that it encourages the turn and the front driving wheel must overcome this force in order to straighten out the machine. Thus the machine is more stable, or wants to travel more in a straight line, when the castor wheels are leading and the driven wheel are trailing.

In U.S. Pat. No. 7,159,687 issued Jan. 9, 2007 by inventor Dunn and assigned to the present assignee is shown a typical machine of this type, where the ground speed and steering of the machine is achieved by varying the flow output from two individual hydraulic pumps each driving a hydraulic motor attached to the drive wheels. In an application using hydraulic piston pumps, this flow is varied by changing the angle of the cam-plate or swash plate inside the pump which varies the displacement of the pump.

In US published application 2009/0242219 (Dunn et al) published Oct. 1, 2009 and assigned to the present assignees shows further details of the steering system for a tractor of this general type, the disclosure of which is incorporated therein by reference.

To vary the speed of the machine, both pump displacements are changed simultaneously. To steer the machine, the displacement of each pump is varied relative to each other so that the flow to each wheel is different which causes the machine to turn.

The above patents therefore provide a tractor which can travel at increased speeds both in field operation and also in transport. While relatively low speed movement allows an arrangement in which the cab is mounted directly to the frame. However increased speeds require the addition of an effective suspension system for the tractor to increase the isolation of the operator from rough terrain during field operation.

SUMMARY OF THE INVENTION

It is one object of the invention to provide a cab suspension for a hydraulically driven and steered tractor of the above general type.

According to one aspect of the invention there is provided a swather tractor comprising:

a tractor frame;

ground wheels for supporting the tractor frame including two driven wheels at a first driven end of the tractor for driving forward motion of the tractor over the ground and two non-driven castor wheels mounted at a second end of the tractor;

wherein the driven wheels each include a hydraulic drive motor for driving the wheel;

an engine mounted on the tractor frame;

mounting assemblies at the driven end for supporting a crop cutting header at a position in front of the driven end and in front of the cab when the driven end is forwards;

a cab mounted on the tractor frame;

the cab including a seat for an operator and control devices for manual operation by the operator including a speed control device and a steering control device;

the speed control device including a speed control linkage having a mechanical speed link arm mounted on the cab and movable to effect a speed control;

the steering control device including a steering control linkage having a mechanical steering link arm mounted on the cab and movable to effect a steering control;

the cab having a base for attachment to the tractor frame and a cab structure upstanding from the base containing the seat and control devices;

and a suspension for supporting the cab on the tractor frame, the suspension comprising:

four spring elements arranged substantially at four corners of the base each arranged to support the base from the frame and each allowing up and down spring movement of the base relative to the frame;

a first link arrangement comprising at least one first link pivotally connected at a first end to the base and pivotally connected at a second opposed end to the frame, the first link being substantially horizontal and arranged such that the first link prevents movement of the base relative to the frame in a direction longitudinal of the first link;

a second link arrangement comprising at least one second link extending in a direction at right angles to the first links and pivotally connected at a first end to the base and pivotally connected at a second opposed end to the frame, the second link being substantially horizontal and arranged such that the second link prevents movement of the base relative to the frame in a direction longitudinal of the second link;

said first link being generally parallel to the steering link arm and arranged to remain generally parallel thereto when the cab moves on the suspension.

said second link being generally parallel to the speed link arm and arranged to remain generally parallel thereto when the cab moves on the suspension.

The steering link arm is an elongate member located underneath the cab and is arranged to move in a direction substantially along its length in the steering action. Similarly the speed link arm is an elongate member located under the cab and is arranged to move in a direction substantially along its length in the speed control action.

This arrangement preferably has the effect that the first link and the second link are arranged such that steering and ground speed are substantially unaffected when the cab moves on the suspension.

Preferably the first link is arranged in the side to side direction.

Preferably the second link is arranged in the fore and aft direction.

Preferably the first and second links are arranged substantially at right angles.

Preferably the first link is connected to the cab at a position adjacent a center line of the base.

Preferably the second link is connected to the cab at a position adjacent a fore and aft center of the base.

Preferably there is provided a third link which is parallel to either the first link or to the second link, the third link being substantially horizontal and arranged such that the third link prevents movement of the base relative to the frame in a direction longitudinal of the third link.

Preferably the first, second and third links prevent rotation or twisting of the cab around a vertical center line.

Preferably the third link is parallel to the second link, the second and third links being spaced on respective sides of a center line of the cab.

The arrangement described herein is based on the fact that the fore/aft link or links are generally parallel with and generally the same length as the ground speed linkage. The lateral link is generally parallel with and generally the same length as the steering link. These two features allow the cab to move in such a way that steering and ground speed are minimally affected or substantially unaffected during cab movement. That is any difference between the optimum geometry is such that the steering and speed controls are not affected sufficiently to cause a loss or proper control of the movement of the tractor. While the changes might be minimally discernible by the operator, they are insufficient to cause the operator to make changes or to interfere with the proper harvesting or to cause unacceptable movements on the operator.

The links disclosed herein are preferably parallel to the centerline but this is not essential depending on the geometry of the speed control link arm.

The first link extends in the side to side direction and has one end thereof substantially at a longitudinal center line of the base. However this is not essential and it does not have to be exactly perpendicular to the centerline.

In combination the stabilizing links cause the cab to travel in a similar arc-like path to the ground speed and steering links travel. While the arrangement controls movement of the center of the cab generally to up and down movement, this movement is not directly vertical since if the cab moves exactly vertically then the speed or steering may change.

Preferably the arrangement provides two parallel links in one direction and at least one in the direction at right angles. The pair could be arranged in the side to side direction. The links do not have to be at exactly right angles, again depending on the geometry of the speed and steering links.

It is suitable that the front to rear link or links end approximately at the transverse center line and the transverse link or links end approximately at the longitudinal center line to achieve the movement required. However this is not essential and it is more important that the link lengths and position generally match the steering and ground speed link arms. In the arrangement described and shown hereinafter, for reasons of design limitations and geometry, the stabilizing links are longer than the steering and ground speed link arms. However ideally they would be of identical length and be oriented at the same angle.

This arrangement of speed/steering links and the stabilizing links ensures that the steering and ground speed are affected only slightly when the cab floats up and down. This allows the cab suspension to have the four point suspension, which is superior to two point suspension systems typically used for such cabs.

The parallel links can be at any angle to the fore and aft direction including but not limited to the side to side direction. The fore and aft direction is preferred since this provides the greatest strength to resist the horizontal movement of the base of the cab in the direction of primary movement of the cab which is the fore and aft pitching direction.

It is also possible that the links are not parallel but all are arranged at different angles to resist the movement in the direction of the link with the combination of restrictions holding the base against horizontal movement in any direction which allowing the upward and downward movement as required to allow pitching and rolling of the cab structure itself.

Preferably both the first and second links have the first end thereof pivoted to the base at the rear end and the second end thereof pivoted to the frame at front end. However this is not essential and one of the links may be reversed.

Preferably the third link extends in the side to side direction and has one end thereof substantially at a center line of the base and the other end at the side of the cab. The link can be arranged with the outer end fastened to the base and the inner end to the frame or vice versa as this has no effect. The location of the inner end at approximately the mid-line of the cab provides sufficient strength without interfering with the links in the fore and aft directions.

The arrangement in which the center of the base of the cab is constrained to move substantially vertically while allowing pitch and roll movements of the cab is advantageous in that it effectively supports the operator against tiring movements and also it allows the control systems of the cab which communicate though the base to operate the drive and steering without the danger of a rhythmic cycle of movement or "hunting" being generated. The arrangement uses simple commercially available spring and shock absorbers with inexpensive links and avoids the use of complex control systems using sensors responsive to the movement.

BRIEF DESCRIPTION OF THE DRAWINGS

One embodiment of the invention will now be described in conjunction with the accompanying drawings in which

FIG. 1 is a top plan view partly in phantom and partly broken away showing a tractor of the type with which the present invention is concerned in the cab forward position.

FIG. 2 is a side elevational view of the tractor of FIG. 1 in which the operator's seat and console have been rotated for operating the tractor in an engine forward position.

FIG. 3 is a schematic illustration of the control system for the tractor.

FIG. 4 is a top plan view of the control elements of the console of FIGS. 1, 2 and 3.

FIG. 5 is a schematic illustration of the linkage controlling the cam plates of the pumps providing hydraulic fluid for driving the driven wheels of the tractor of FIG. 1, showing the linkage in the neutral position of the speed control and the mid position of the steering control.

FIG. 6 is a schematic illustration of the linkage of FIG. 5, showing the linkage in the maximum forward speed position of the speed control and the mid position of the steering control.

FIG. 7 is a schematic illustration of the linkage of FIG. 5, showing the linkage in the maximum forward speed position of the speed control and a turn position of the steering control.

FIG. 8 is a plan view showing in more detail the steering system of FIG. 7 and including a steering control cylinder for actuating movement of the steering control link.

In the drawings like characters of reference indicate corresponding parts in the different figures.

DETAILED DESCRIPTION

Figure 1:
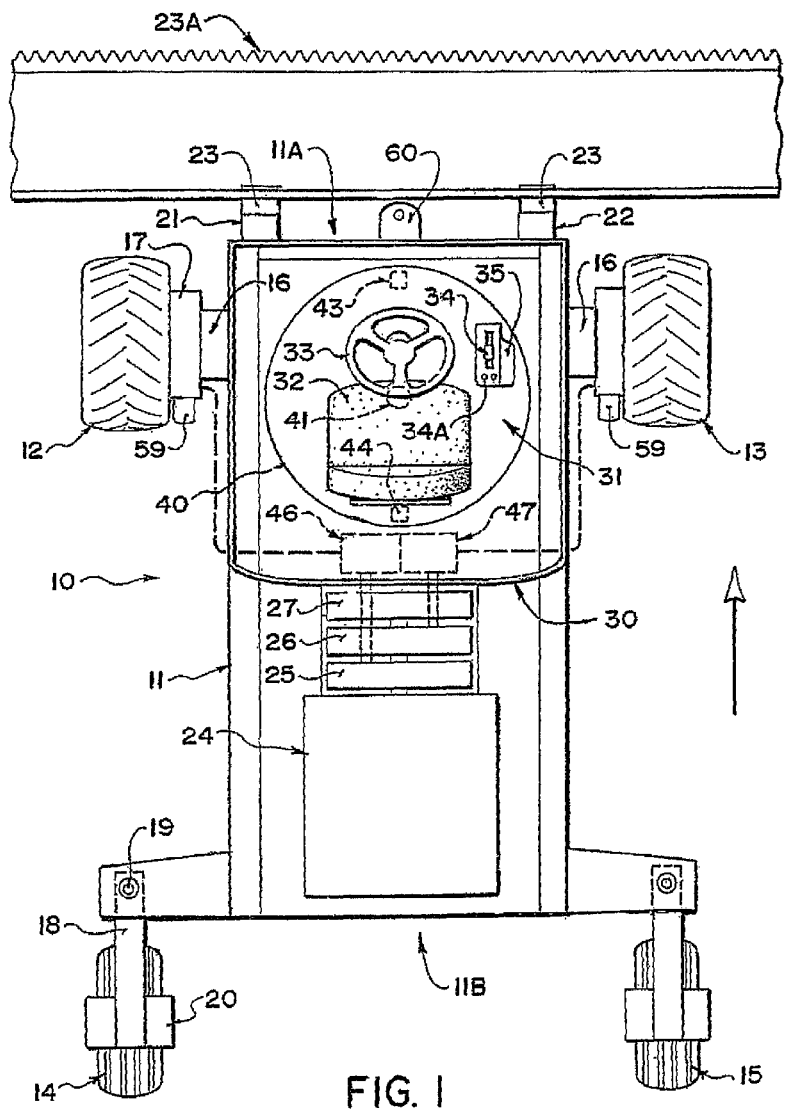
FIGS. 1 to 8 are taken from previously mentioned published Application 2009/0242219 for complete disclosure of the construction herein.
Figure 2:
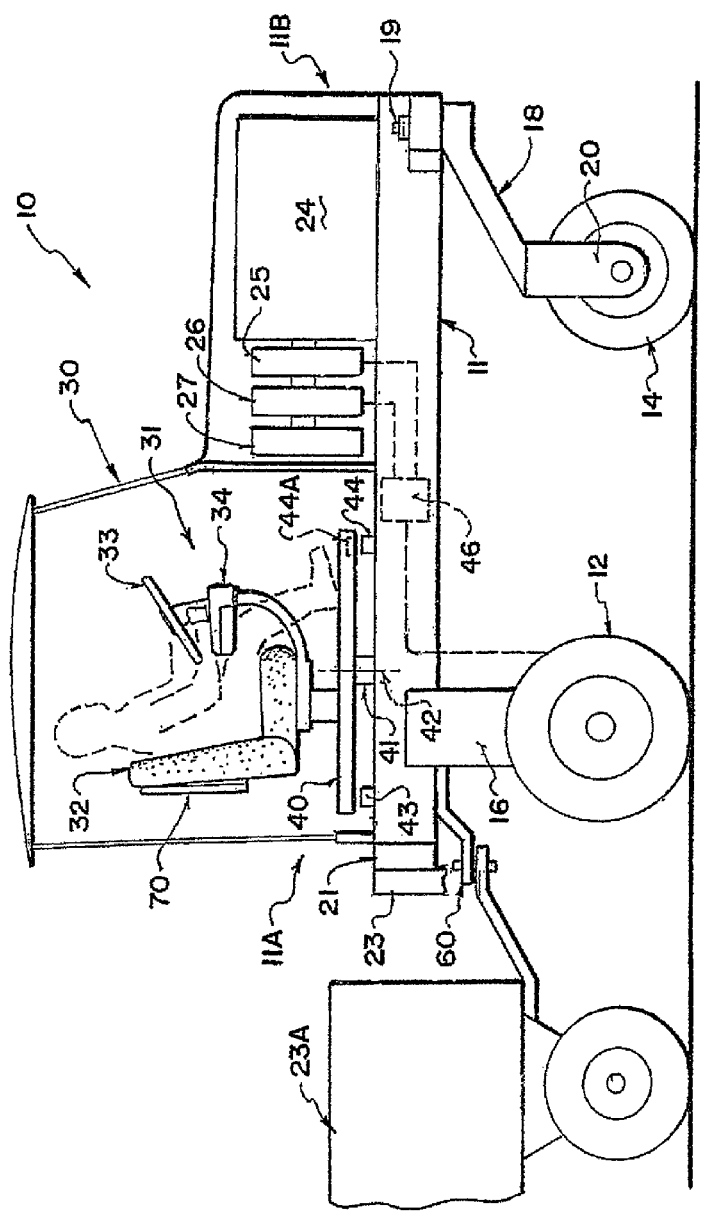

The following description is taken from previously mentioned published US Application 2009/0242219 for complete disclosure of the construction herein and relates to FIGS. 1 to 8 of that application.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal.

Many of the above components are well known and conventional and can be found in many different designs of such tractors manufactured by a number of manufacturers including the present assignee. Further details of the reel speed control and reel location control are disclosed in the above co-pending application to which reference may be made filed simultaneously with this application.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIG. 2 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 45 carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab forward position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical and/or hydraulic connections as will be apparent to one skilled in the art.

Figure 3:
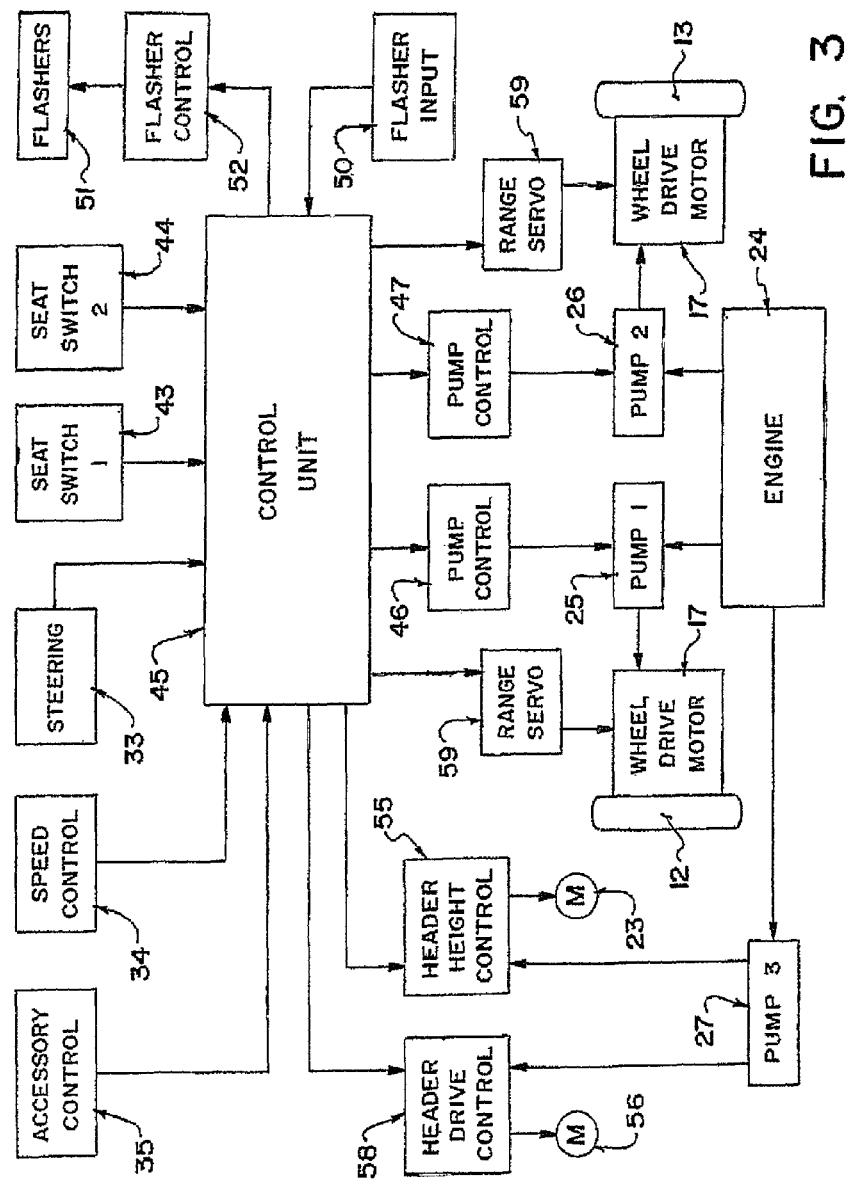
Figure 4:
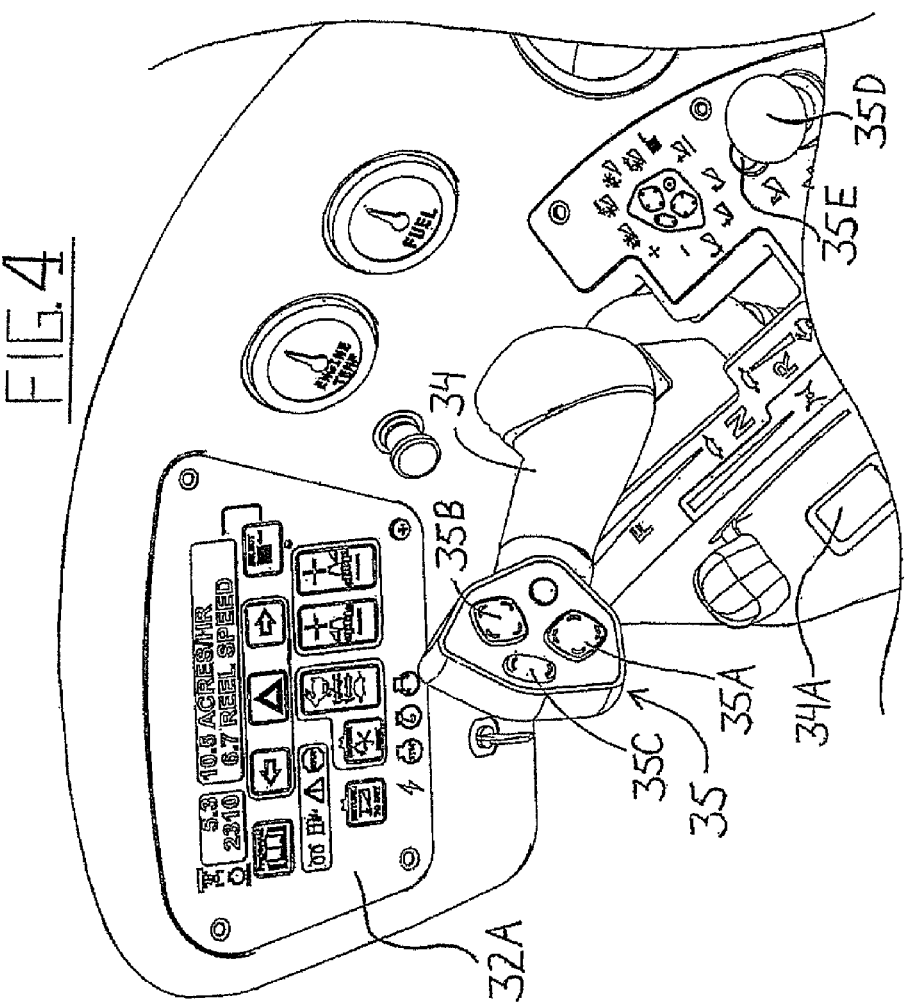

Turning now to the mechanical section as shown in FIG. 1 and the schematic control system as shown in FIG. 3, the speed control system 34 controls the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determine by the control of the pumps 25 and 26.

In addition the steering 33 controls the pumps 25 and 26 to generate a differential in the flow thereof so as to generate a differential in the speed of the motors 17. In the schematic illustration of a system shown in FIG. 3, this operation is shown as effected by a control unit 45 which is responsive to the signal from the steering and from the speed control and thus selects the positions of the pumps accordingly. However in the system described hereinafter, this is effected mechanically by providing two separate inputs to the pump control arrangement to provide a required speed and then a differential between the two pump controls.

As shown in FIG. 3 the control unit 45 is also responsive to input from the seat switch sensors 43 and 44 so that operation of many of the systems shown in FIG. 3 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation.

In addition to the basic control of the movement of the vehicle, the control unit also provides outputs for controlling other elements of the tractor. In a first element the control console includes a conventional flasher input lever indicated at 50 by which the operator can operate turn signals or four way flashers as indicated by the flashing lights 51. The control unit is arranged so that the four flashers indicated at 51 can be operated simultaneously by the flasher control 52 in both positions of cab forward and engine forward described previously. However, as it is intended that primary mode of high speed transportation of the tractor is in the engine forward position, the turn signals are operated by the flasher control 52 so that the turn signals will only operate when the operator console and tractor are arranged in the engine forward position as detected by the respective seat switch.

The header drive system including the height control cylinders 23 actuated by a control system 55 is driven with fluid from the pump 27 also driven by the engine 24. The pump also supplies fluid to a motor 56 which drives the operation of the header. This drive can comprise a single motor driving all the components of the header including the cutting knife, the reel and any collection system including drapers and/or augers. However individual motors and individual controls can be provided.

The control unit 45 is arranged, in response to operation of the seat switch indicating that the operator console is in the cab forward position acts to allow actuation of the motor 56 through the drive control 58. When the seat is out of that position and particularly turned to the engine forward position, actuation of the header is prevented.

The height control 55 is arranged to provide adjustment of the height of cutting action and also to provide a raised position away from the cutting action. The control unit 45 is arranged to control the header/height control 55 so that the header is maintained in the raised inoperative position and cannot fall under automatic control to the cutting position when not in cab forward position.

The drive motors 17 also include adjustment by a servo unit 59 which selects different ranges for the motor. This is obtained by adjusting the cam plate of the motor to different displacement positions as is well known to one skilled in the art.

In one embodiment the drive motors 17 are arranged to have two different ranges that is a low speed range and a higher speed range. It is of course appreciated that the low speed range provides higher torque.

The control unit is arranged such that the high speed range can only be accessed when the operator console is in the engine forward position and thus cannot be accessed when the operator console is in the cab forward position. In this arrangement when the operator operates essentially one of the switches 35 to select one or other of the ranges, in the situation where the operator console is in the cab forward position, the system indicates to the operator that the high range cannot be accessed. In this way the intention is that the tractor can travel at significantly higher speeds in the engine forward position and is restricted to the lower speeds when in the cab forward position, bearing in mind that the tractor is unstable at the higher speeds when in the cab forward position.

In an alternative arrangement a three range motor can be provided with low, intermediate and high ranges accessible. In this arrangement the low and intermediate ranges are accessible in the cab forward position and the low and high ranges are accessible in the engine forward position. In the engine forward position the low ranges available for high torque and the high ranges are available for high speed. In the cab forward position the intermediate range is available for higher speed operation in the field.

Figure 5:
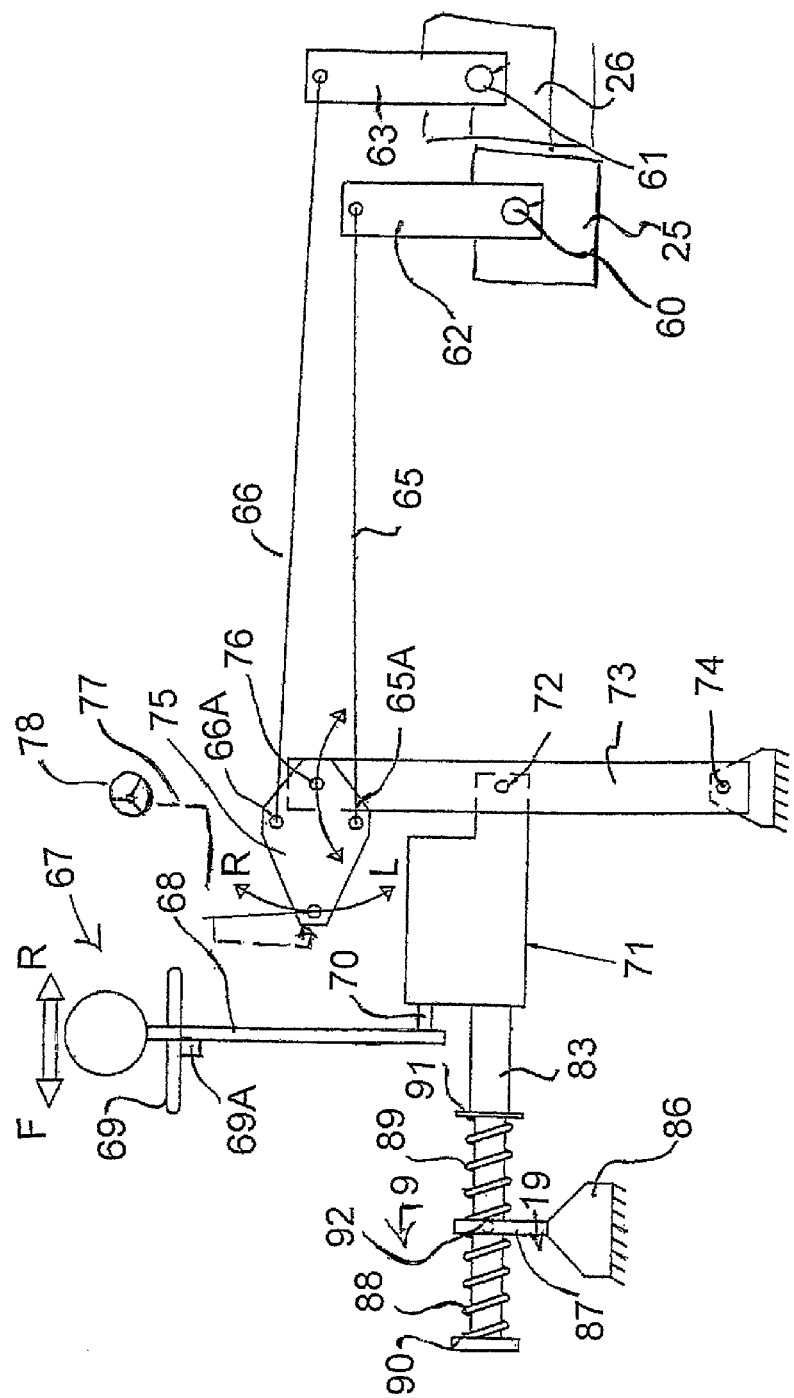

In FIG. 5 is shown schematically the linkage for actuating the movement of the cam plates of the two pumps for providing a selected volume of flow from each pump to the respective driven wheel.

Thus the first pump 25 and the second pump 26 are shown schematically in FIG. 5 and each includes a respective control shaft 60, 61 for the cam plate of the pump. Pumps of this type are of course well known and their construction is well known to one skilled in the art and such pumps are commercially available from many sources.

Figure 6:
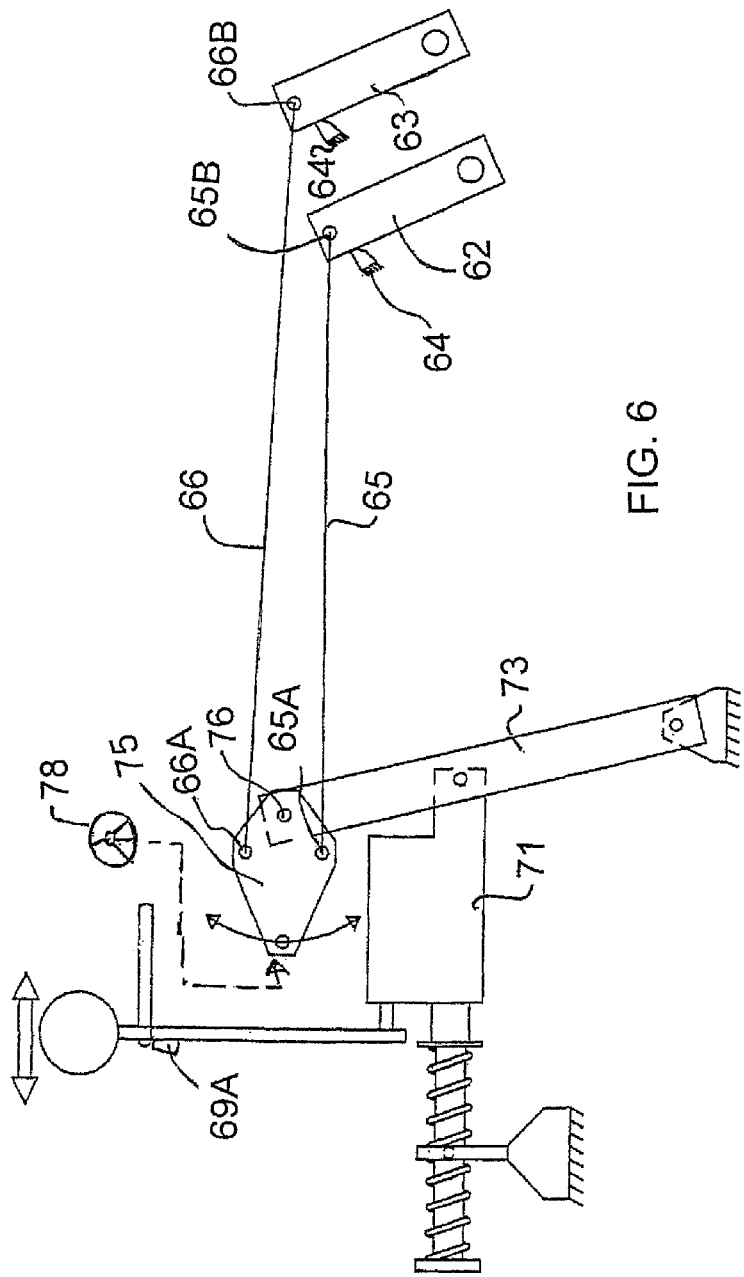
Figure 7:
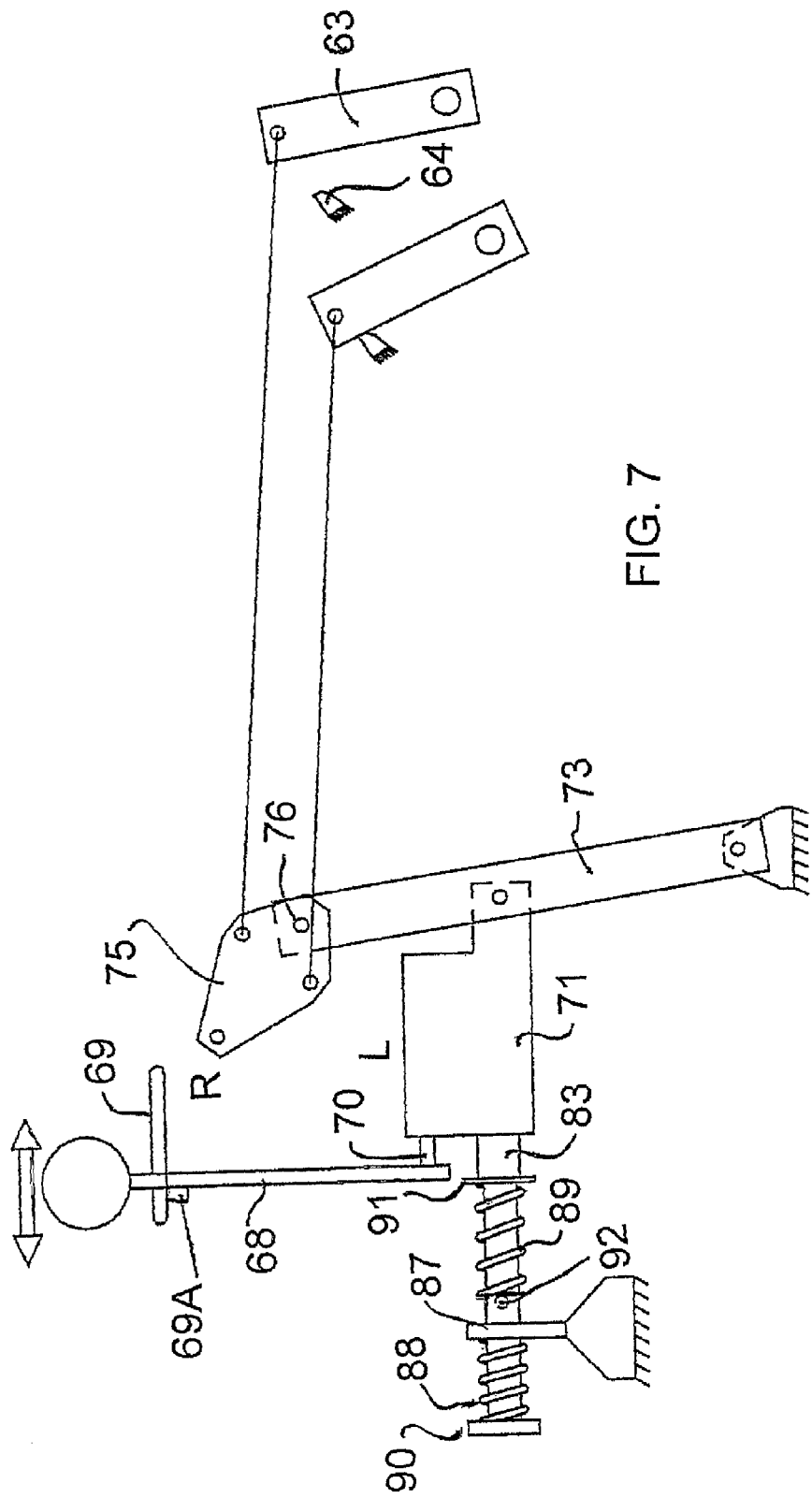

Each of the shafts 60, 61 is controlled in its position by a respective actuation lever 62, 63. In FIG. 5 the levers are shown in a neutral position in which the cam plate has zero displacement so that no fluid flow is developed as the pump rotates. In FIG. 6, the levers have been moved to a maximum forward position against an end stop 64 so that each lever is moved from the vertical minimum position of FIG. 5 to an angled maximum position in FIG. 6. The end stop is shown schematically as a mechanical element separate from the lever and located on the pump but the end position of the movement can be determined by any suitable element either at the pump or at another location which limits the movement of the cam plate. Indeed the physical movement of the cam plate itself may act as the end stop without any necessity for an extra element contacting the lever. The movement of the levers is actuated by a pair of links 65 and 66 which are a fixed length and extend from a respective end 65A 66A at a control element of the linkage through to an end 65B, 66B at the respective lever. As the length of each link is fixed, movement of the ends 65A, 66A is transmitted to the lever in direct proportion.

The movement of the link 65 and 66 is controlled by two elements of the linkage shown in FIG. 5. Thus there is provided a manually operable speed control generally indicated at 67 which includes a manually operable lever 68 movable within a guide slot 69. The lever 68 is attached by a bar 70A and a speed control link 70 to a servo cylinder 71. The servo cylinder 71 is connected by a pin 72 to a lever 73 the lever 73 forms a speed control member which is connected to both the ends 65A and 66A so that pivotal movement of the lever 73 about a mounting pin 74 in a common plane with the link 65 and 66 pushes the links commonly generally along their length so that the movement of the lever 73 is communicated to movement of the arms 62 and 63 of the pumps. The amount of movement of the lever is thus communicated to both arms 62 and 63 simultaneously and commonly at a proportion of the angle of movement which is dependant upon the geometry of the system. The geometry can of course be modified according to one skilled in the art and is shown only schematically. The steering link arm or lever 73 is thus an elongate member located underneath the cab and is arranged to move in a direction substantially along its length in the steering action. Similarly the speed link arm 70 is an elongate member located under the cab and is arranged to move in a direction substantially along its length in the speed control action.

Thus as illustrated, movement of the servo cylinder 71 to the left pulls the lever 73 which pulls the link 65 and 66 rotating the arm 62 and 63 to increase the angle of the cam plate from the neutral position through to the maximum position.

The control linkage also includes a steering member 75 which is carried on the lever 73 and which is connected to the ends 65A and 66A of the links. Thus the movement of the lever 73 is communicated to the link 65 and 66 through the structure of the steering member 75. The steering member 75 is mounted for pivotal movement about a pin 76 at the end of the lever 73 remote from the pin 74. When the steering member 75 remains fixed in a central position as shown in FIG. 5 about the pin 76, forward and rearward movement of the lever 73 actuated by the speed control 67 and the sped control link 70 is communicated to the link 65 and 66 as common movement without any differential.

Figure 8:
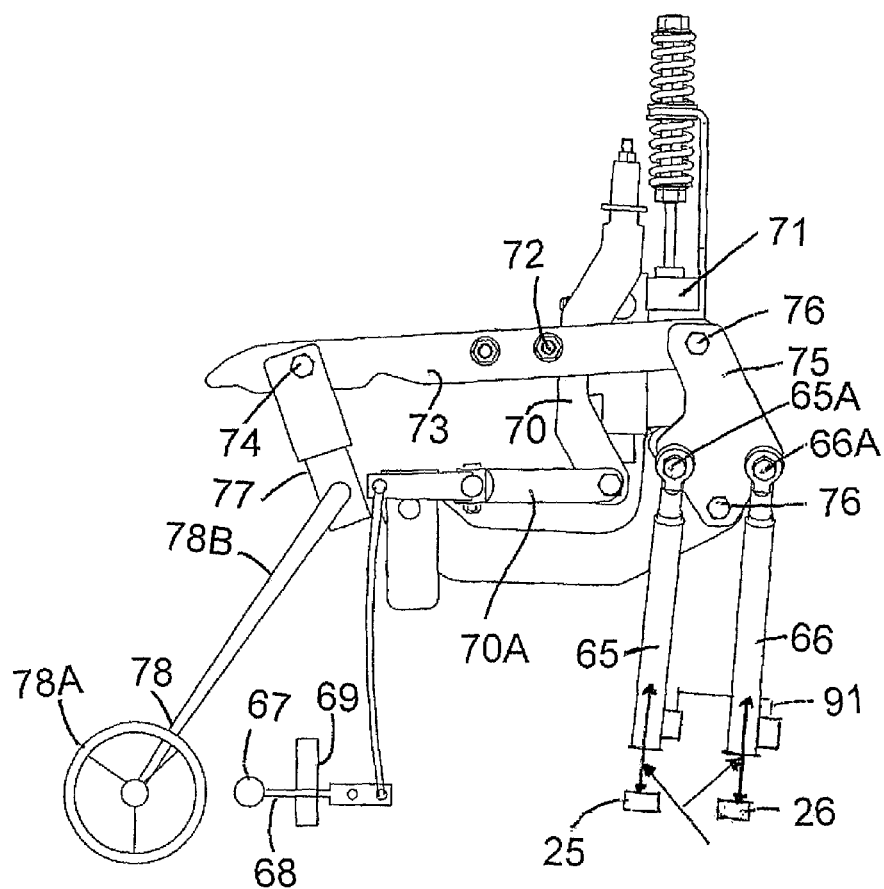

However differential movement between the link 65 and 66 can be provided by side to side pivotal movement of the steering member 75 about the pin 76. In this way as the lever 73 remains stationary the ends 65A and 66A can be moved relative to one another by the pivotal movement of the steering member 75 about the pin 76. The steering member 75 is actuated in its movement by the steering link 77 from the manually operable steering control 78 generally in the form of a steering wheel 78A and a steering shaft 78B. The linkage is shown only schematically from the steering wheel to the steering member 75 since this can be constructed in many different ways as well known to one skilled in the art. However it will be appreciated that turning of the steering wheel from right to left through a mid position will actuate pivotal movement of the steering member 75 from right to left as indicated about the pin 76. The steering movement can be effected while the lever 73 remains stationary or while the lever is moved since these movements are basically independent of one another. In FIGS. 5, 6 and 8 the steering member is shown in the central or straight ahead position whereas in FIG. 7 the steering member 75 is pivoted to one end as indicated at R so that the steering member 75 pivots about the pin 76 on the lever 73.

The above arrangement is shown and described in the above applications of the present Assignees.

Figure 9:
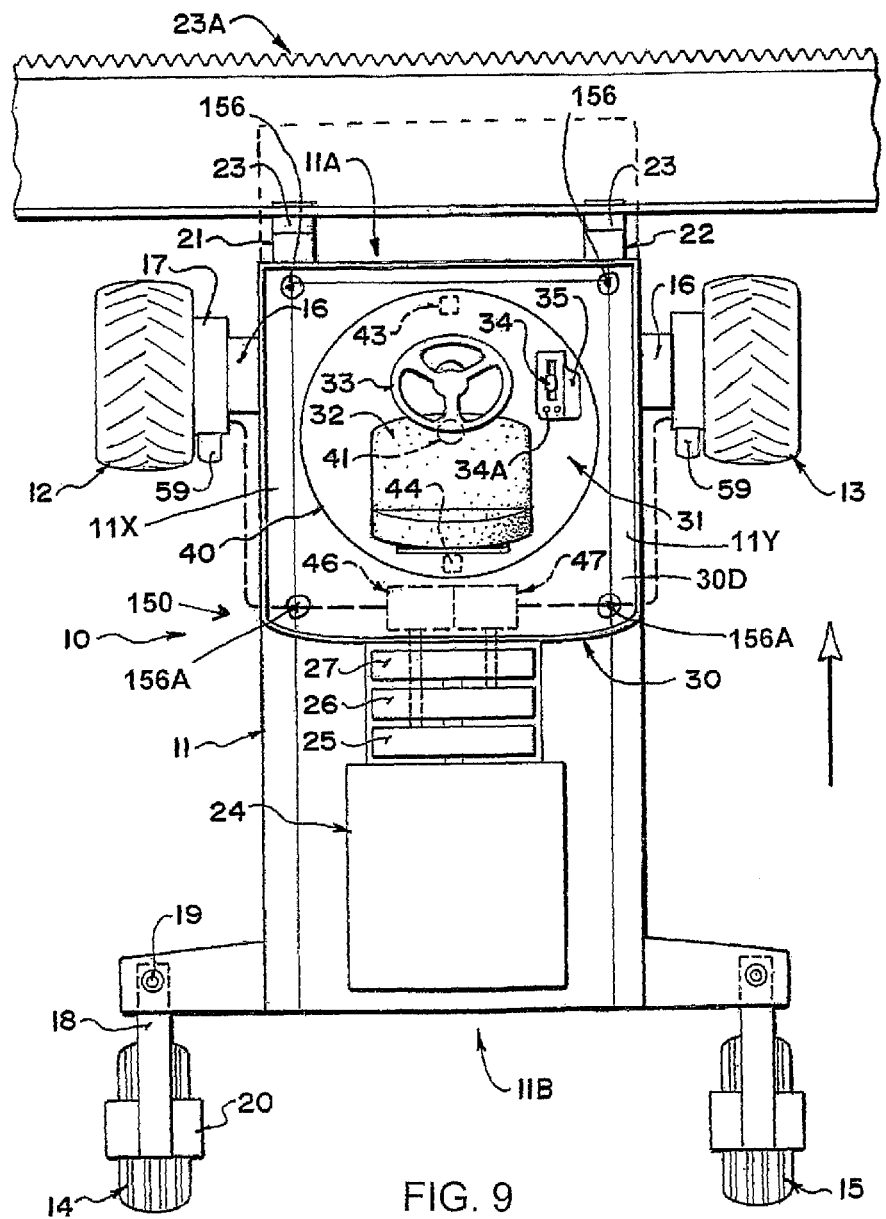
FIG. 9 is a top plan view taken from FIG. 1 which shows the windrower tractor with the suspension system according to the present invention shown only schematically.
Figure 10:
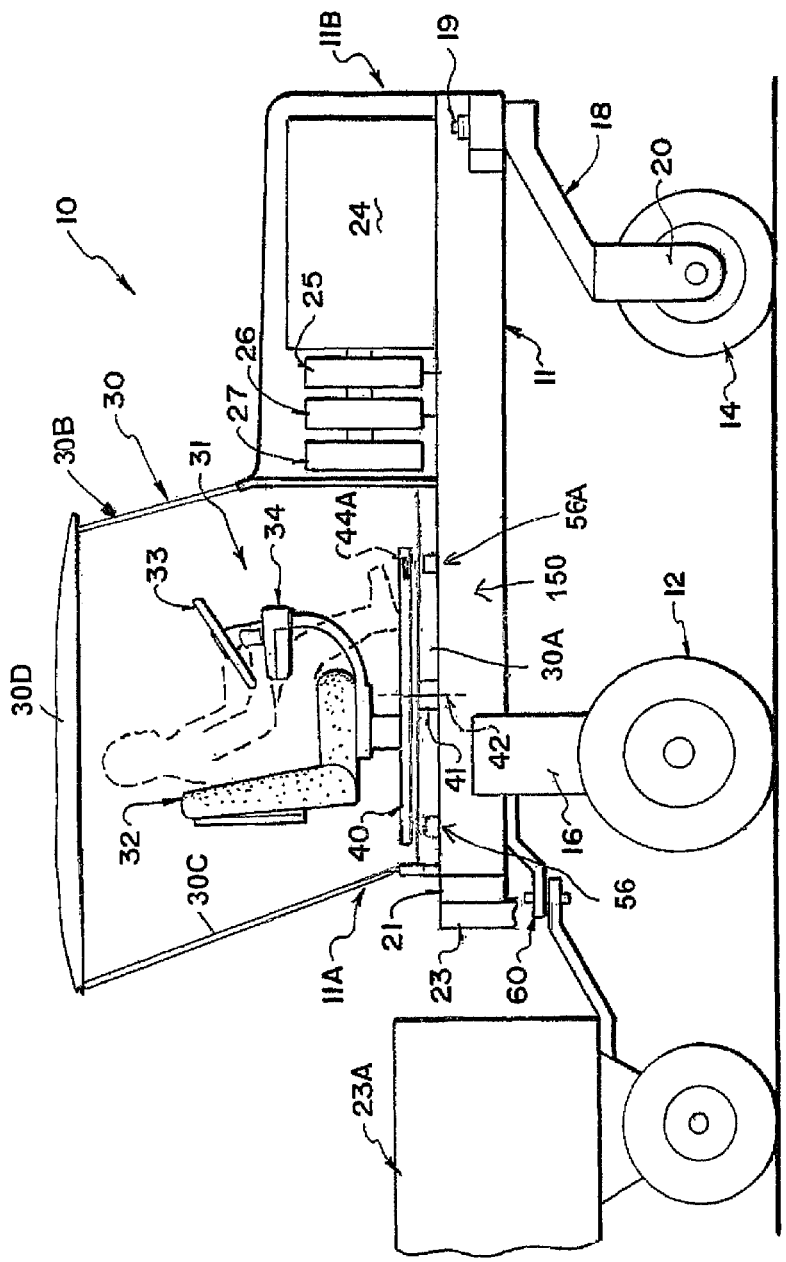
FIG. 10 is a side elevational view taken from FIG. 2 which shows the windrower tractor with the suspension system according to the present invention shown only schematically.
Figure 11:
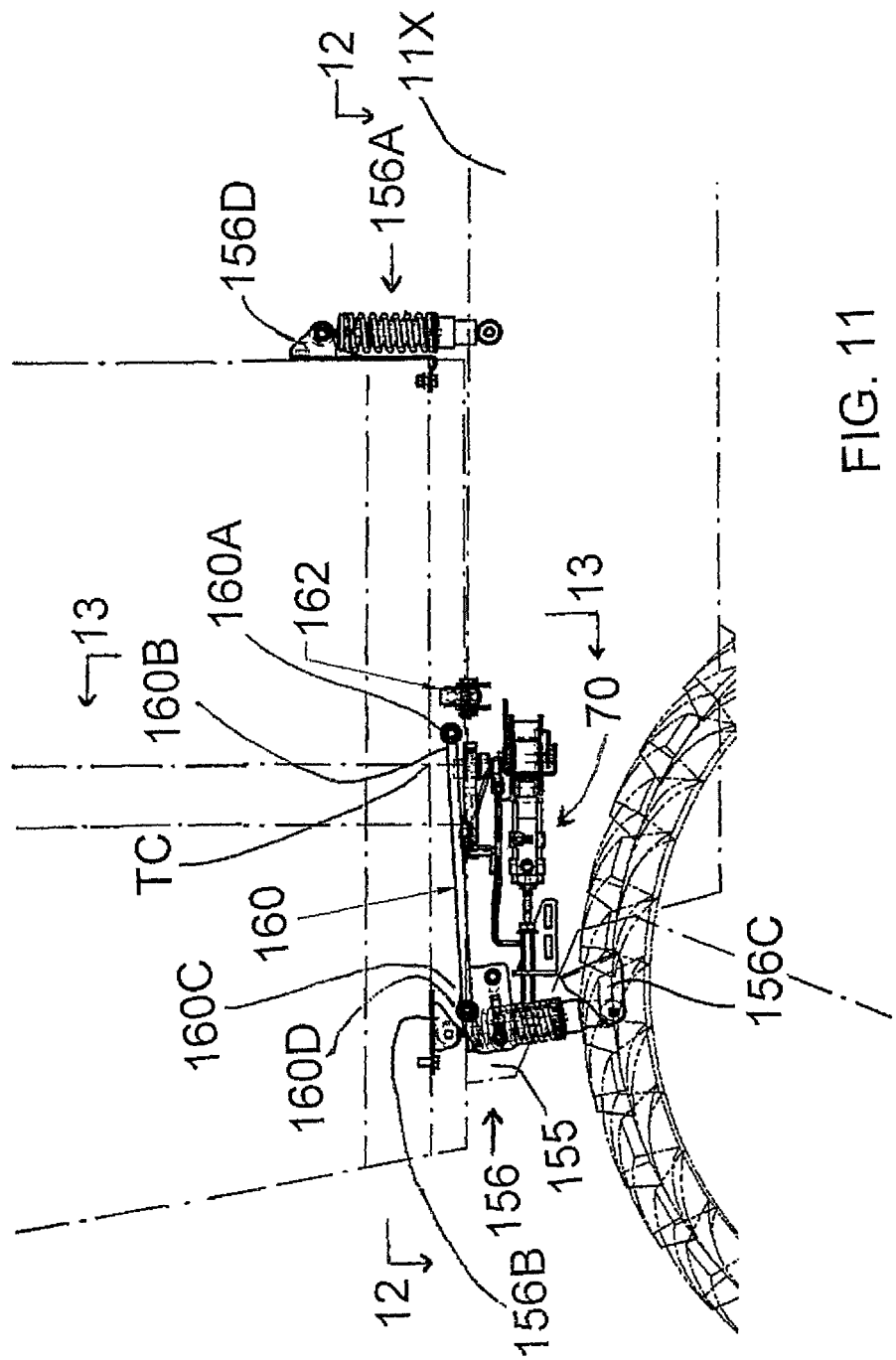
FIG. 11 is a side elevational view of the frame and cab only of FIG. 8 showing the suspension system of FIG. 8 in more detail and showing the control linkage of FIGS. 5 to 7.
Figure 12:
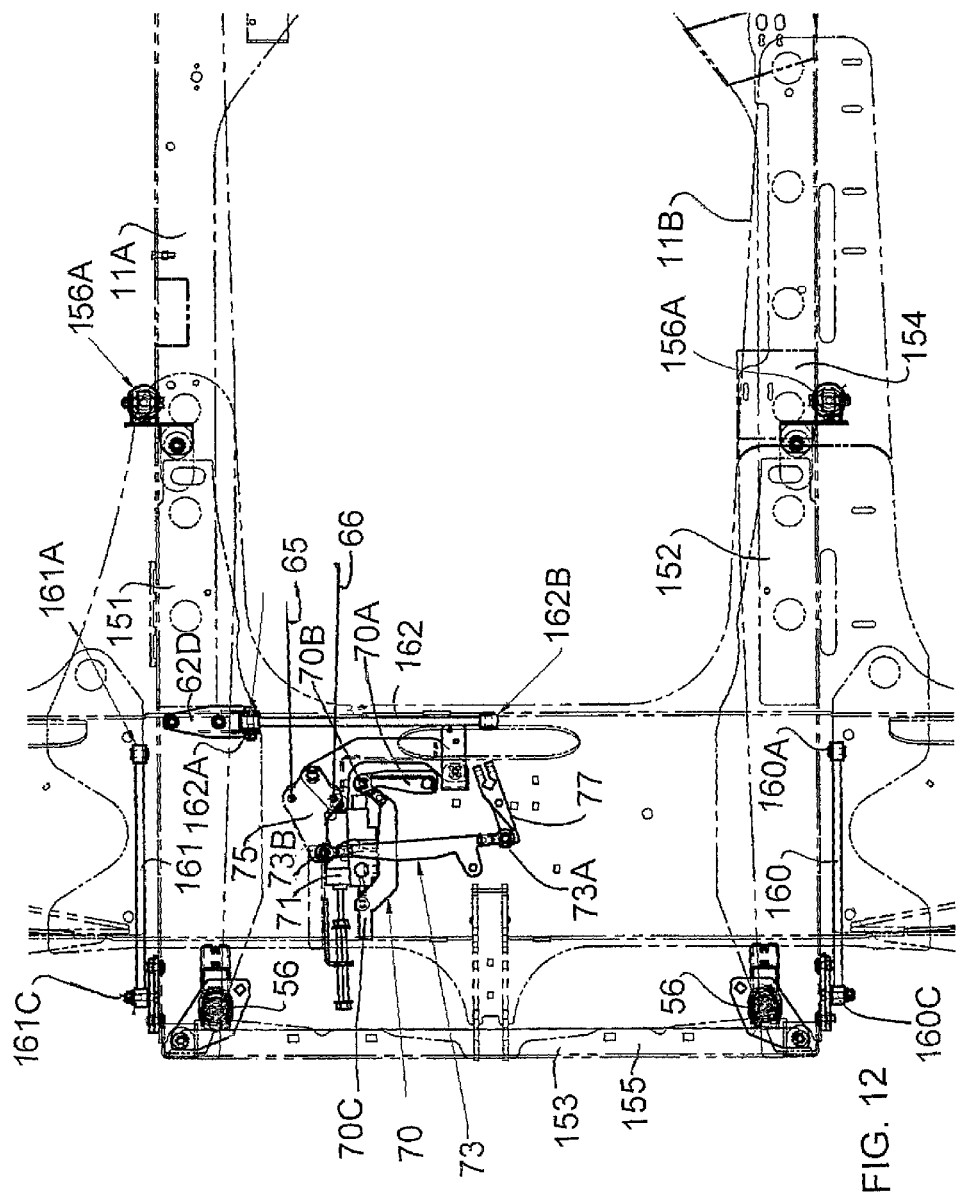
FIG. 12 is a view along the lines 12-12 of FIG. 11.
Figure 13:
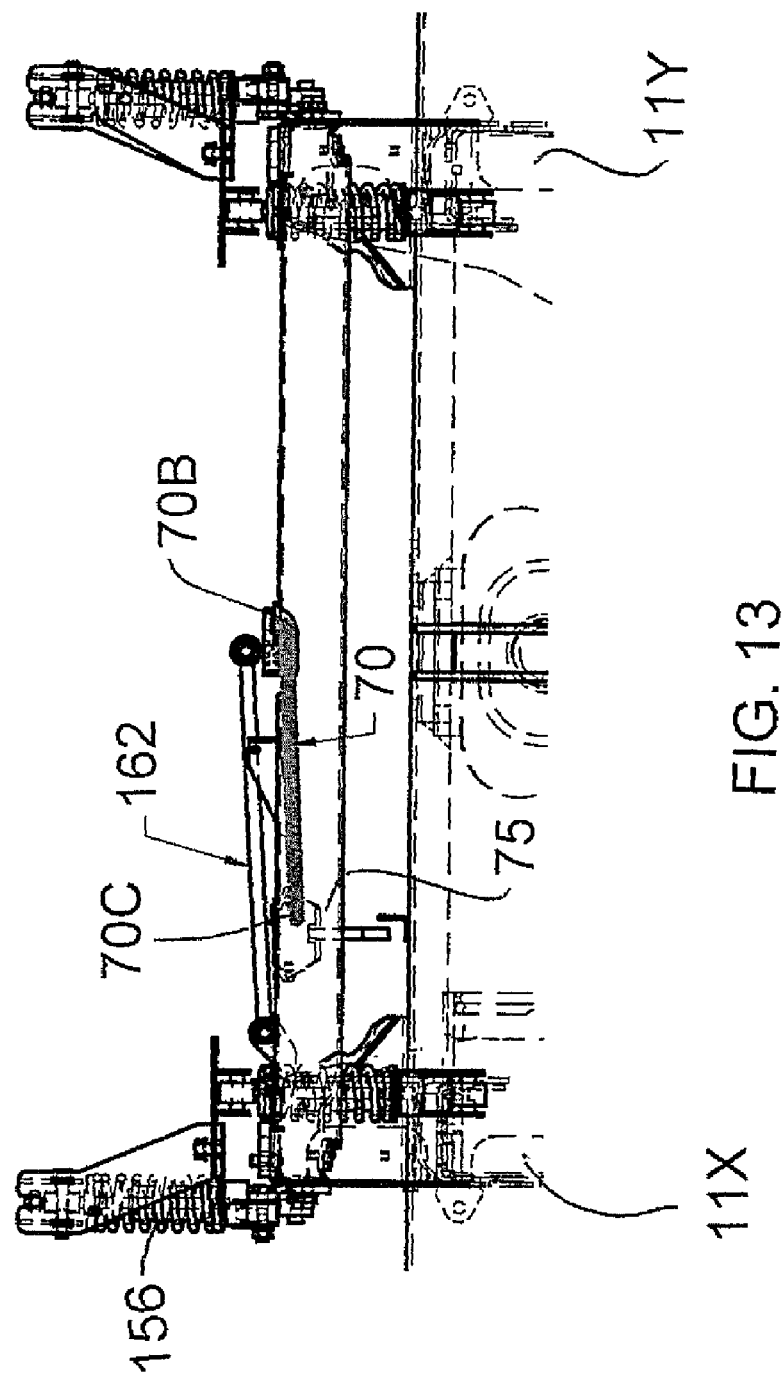
FIG. 13 is a view along the lines 13-13 of FIG. 11.

Turning now to the suspension arrangement of the present invention, the suspension system shown at 150 in FIGS. 8 and 9 is shown in more detail in FIGS. 10, 11 and 12 and is connected between the frame 11 and the base 30A. Typically the frame 11 includes two side rails 11A and 11B which are located at the sides of the cab base 30A. Thus the side edges 151 and 152 of the base substantially overlie the rails 11A and 11B. Front and rear edges 153 and 154 of the base are at right angles to the rails and the front edge 153 overlies a cross rail 55.

The cab base is supported on four spring elements 156 at the two front corners of the four corners of the base and spring elements 156A at the rear corners. Thus the spring elements 156 and 156A are at spaced positions across the base arranged to support the base from the frame. The springs 156 thus extend to the side rails 11X and 11Y with a lower end carried in a suitable mount and the upper end attached to the base.

Each spring element 156, 156A includes an outer coil spring and an inner shock absorber of a type conventional used in suspension systems.

Thus the front the elements 156 are mounted underneath the base with an upper end attached to the bottom surface of the base by a lug 156B. A lower end of the spring element is attached to a frame member 156C depending below the base and carried on a front of the respective side rail 11X, 11Y.

Thus the rear the elements 156A are mounted above the rail 11X, 11Y an upper end attached to the rear surface of a wall of the cab by a lug 156D. A lower end of the spring element is attached to the respective side rail 11X, 11Y.

Each spring element comprises typically a vertical coil spring or can comprise an air bag allowing spring movement of the base relative to the frame. Each spring element is associated with a dampener or shock absorber for dampening spring movement in the spring element. On example may have the shock absorber located inside the coil spring. Thus the springs allow the cab to float upwardly and downwardly and also, in the absence of control links, allows side to side and front to rear movement of the cab. However this movement is limited by three links 162, 160 and 161.

The first link 162 is pivotally connected at a first end 162B to the base at the longitudinal center line and pivotally connected at a second opposed end 162A by a bracket 162D to the frame at the side rail 11X. The first link 162 is substantially horizontal and again the third link prevents movement of the base relative to the frame in a direction longitudinal of the first link.

The second link 160 is pivotally connected at a first rear end 160A to the base 30A by a bushing 160B at a position closely adjacent a transverse center line TC. The second link 160 is pivotally connected at a second front end 160C to the crossrail 155 of the frame or to a suitable side component of the frame by a bushing 160D. The second link 160 is substantially horizontal so that the second link prevents movement of the base relative to the frame in a direction longitudinal of the second link that is in the fore and aft direction. The second link 160 is located outboard of the side of the cab base.

The third link 161 is parallel to and symmetrical relative to the second link 160 and is similarly pivotally connected at a first rear end 161A to the base and pivotally connected at a second opposed front end 161C to the frame. The third link 161 is also substantially horizontal so that the third link prevents movement of the base relative to the frame in a direction longitudinal of the third link. The second and third links are arranged on opposite sides of a longitudinal center line of the base.

The links 160, 161 and 162 therefore cooperate so as to substantially constrain horizontal movement of the base relative to the frame both in front to rear directions and in transverse directions while allowing the sides of the base to float upwardly to allow rolling movement of the cab structure relative to the frame and the front and rear of the base to float upwardly to allow pitching movement of the cab structure relative to the frame. However, as the base is constrained against side to side and front to rear movement, the links are arranged such that the center point of the cab base is constrained to move substantially vertically in an arc.

The links 160 and 161 are parallel and spaced on each side of the longitudinal center line so that they tend to prevent twisting of the cab about the vertical center axis. The first link 162 is substantially at right angles to the first two links and prevents side to side movement.

The side to side stabilizing link 162 is generally parallel with the steering link arm 73 (FIGS. 5 and 8) and remains generally parallel when the cab floats up and down. As shown in FIG. 8, the steering link arm 73 connects between the steering member 75 which is pivoted by the steering mechanism to drive the differential between the links 65 and 66 to effect the steering action. The link 162 and the link arm 73 both have an inner end 73A, 162B approximately on the center line. The outer end 162A of the link 162 is spaced outwardly of the end 73B of the link arm 73 but this slightly greater length is not sufficient to significantly affect the operation as described above. The geometry requires that the outer end 162A is located at the frame.

The fore/aft stabilizing links 160 and 161 are generally parallel with the speed link 70 (FIG. 5) and remain generally parallel when the cab floats up and down. Again the links 160 and 161 and the link arm 70 both have an inner end 70B, 160A and 161A approximately on the longitudinal center line. The outer end 161C of the link 161 and the outer end 160C of the link 160 are spaced outwardly of the end 70C of the link arm 70 but this slightly greater length is not sufficient to significantly affect the operation as described above. The geometry requires that the outer end 160C and 161C are located at the frame.

This arrangement of speed/steering links and the stabilizing links ensures that the steering and ground speed are affected only slightly when the cab floats up and down. This allows the cab suspension to have the four point suspension, which is superior to two point suspension systems typically used for such cabs.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swather tractor comprising:
a tractor frame;
ground wheels for supporting the tractor frame including two driven wheels at a first driven end of the tractor for driving forward motion of the tractor over the ground and two non-driven castor wheels mounted at a second end of the tractor;
wherein the driven wheels each include a hydraulic drive motor for driving the wheel;
an engine mounted on the tractor frame;
mounting assemblies at the driven end for supporting a crop cutting header at a position in front of the driven end and in front of the cab when the driven end is forwards;
a cab mounted on the tractor frame;
the cab including a seat for an operator and control devices for manual operation by the operator including a speed control device and a steering control device;
the speed control device including a speed control linkage having a mechanical speed link arm mounted on the cab and movable to effect a speed control;
the steering control device including a steering control linkage having a mechanical steering link arm mounted on the cab and movable to effect a steering control;
the cab having a base for attachment to the tractor frame and a cab structure upstanding from the base containing the seat and control devices;
and a suspension for supporting the cab on the tractor frame, the suspension comprising:
four spring elements arranged substantially at four corners of the base each arranged to support the base from the frame and each allowing up and down spring movement of the base relative to the frame;
a first link arrangement comprising at least one first link pivotally connected at a first end to the base and pivotally connected at a second opposed end to the frame, the first link being substantially horizontal and arranged such that the first link prevents movement of the base relative to the frame in a direction longitudinal of the first link;
a second link arrangement comprising at least one second link extending in a direction at right angles to the first links and pivotally connected at a first end to the base and pivotally connected at a second opposed end to the frame, the second link being substantially horizontal and arranged such that the second link prevents movement of the base relative to the frame in a direction longitudinal of the second link;
said first link being generally parallel to the steering link arm and arranged to remain generally parallel thereto when the cab moves on the suspension,
said second link being generally parallel to the speed link arm and arranged to remain generally parallel thereto when the cab moves on the suspension.

2. The tractor according to claim 1 wherein the first link and the second link are arranged such that steering and ground speed are substantially unaffected when the cab moves on the suspension.

3. The tractor according to claim 1 wherein said first link is arranged in the side to side direction.

4. The tractor according to claim 1 wherein said second link is arranged in the fore and aft direction.

5. The tractor according to claim 1 wherein said first and second links are arranged substantially at right angles.

6. The tractor according to claim 1 wherein said first link is connected to the cab at a position adjacent a center line of the base.

7. The tractor according to claim 1 wherein said second link is connected to the cab at a position adjacent a fore and aft center of the base.

8. The tractor according to claim 1 wherein there is provided a third link which is parallel to either the first link or to the second link, the third link being substantially horizontal and arranged such that the third link prevents movement of the base relative to the frame in a direction longitudinal of the third link.

9. The tractor according to claim 8 wherein said first, second and third links prevent rotation of the cab around a vertical center line.

10. The tractor according to claim 8 wherein said third link is parallel to the second link, the second and third links being spaced on respective sides of a center line of the cab.

11. The tractor according to claim 1 wherein said steering link arm is an elongate member and is arranged to move in a direction substantially along its length in the steering action.

12. The tractor according to claim 1 wherein said speed link arm is an elongate member and is arranged to move in a direction substantially along its length in the speed control action.

\* \* \* \* \*